United States Patent
Mountain

(10) Patent No.: US 9,098,172 B2
(45) Date of Patent: *Aug. 4, 2015

(54) APPARATUS, SYSTEMS AND METHODS FOR A THUMBNAIL-SIZED SCENE INDEX OF MEDIA CONTENT

(71) Applicant: Eldon Technology Limited, Keighley (GB)

(72) Inventor: Dale Mountain, Silsden (GB)

(73) Assignee: EchoStar UK Holdings Limited, Steeton (GB)

( * ) Notice: Subject to any disclaimer, the term of this patent is extended or adjusted under 35 U.S.C. 154(b) by 145 days.

This patent is subject to a terminal disclaimer.

(21) Appl. No.: 13/752,004

(22) Filed: Jan. 28, 2013

(65) Prior Publication Data

US 2013/0139200 A1 May 30, 2013

Related U.S. Application Data

(63) Continuation of application No. 12/903,941, filed on Oct. 13, 2010, now Pat. No. 8,364,009.

(51) Int. Cl.
| | |
|---|---|
| *H04N 9/80* | (2006.01) |
| *G06F 3/0482* | (2013.01) |
| *G11B 27/34* | (2006.01) |
| *H04N 5/44* | (2011.01) |
| *H04N 9/82* | (2006.01) |
| *H04N 21/431* | (2011.01) |
| *G11B 27/10* | (2006.01) |
| *G11B 27/28* | (2006.01) |

(Continued)

(52) U.S. Cl.
CPC ............ *G06F 3/0482* (2013.01); *G11B 27/105* (2013.01); *G11B 27/28* (2013.01); *G11B 27/329* (2013.01); *G11B 27/34* (2013.01); *H04N 5/4403* (2013.01); *H04N 9/8227* (2013.01); *H04N 21/431* (2013.01); *H04N 21/4312* (2013.01); *H04N 21/44008* (2013.01); *H04N 21/440263* (2013.01); *H04N 21/440281* (2013.01); *H04N 21/47217* (2013.01); *H04N 21/482* (2013.01); *H04N 21/6118* (2013.01); *H04N 21/6143* (2013.01); *H04N 21/8153* (2013.01); *H04N 21/84* (2013.01)

(58) Field of Classification Search
CPC ............ H04N 1/00442; H04N 21/482; H04N 21/47217
USPC ............................................ 386/241; 725/41
See application file for complete search history.

(56) References Cited

U.S. PATENT DOCUMENTS

| | | | |
|---|---|---|---|
| 7,471,834 B2 | 12/2008 | Sull et al. | |
| 8,078,603 B1 * | 12/2011 | Chandratillake et al. | 707/706 |
| 8,364,009 B2 * | 1/2013 | Mountain | 386/230 |
| 2004/0128317 A1 | 7/2004 | Sull et al. | |
| 2005/0193425 A1 | 9/2005 | Sull et al. | |
| 2006/0107289 A1 | 5/2006 | DeYonker et al. | |
| 2007/0237232 A1 | 10/2007 | Chang et al. | |
| 2009/0158157 A1 | 6/2009 | Shields et al. | |

(Continued)

*Primary Examiner* — Thai Tran
*Assistant Examiner* — Girumsew Wendmagegn
(74) *Attorney, Agent, or Firm* — Lowe Graham Jones PLLC

(57) ABSTRACT

Scene-based program accessing systems and methods are operable to present a program at a scene corresponding to a selected thumbnail-sized image. An exemplary embodiment selects a plurality of image frames from a program based upon a scene separation duration; generates a thumbnail-sized image from each of the selected image frames, and presents the plurality of thumbnail-sized images on a scene index. The scene index is configured to present the plurality of thumbnail-sized images in a time ordered sequence corresponding to a subject matter presentation sequence of the program, and each of the selected image frames are temporally separated from each other by the scene separation duration.

20 Claims, 6 Drawing Sheets

(51) Int. Cl.
*G11B 27/32* (2006.01)
*H04N 21/44* (2011.01)
*H04N 21/4402* (2011.01)
*H04N 21/472* (2011.01)
*H04N 21/482* (2011.01)
*H04N 21/61* (2011.01)
*H04N 21/81* (2011.01)
*H04N 21/84* (2011.01)

(56) References Cited

U.S. PATENT DOCUMENTS

| | | | |
|---|---|---|---|
| 2009/0172543 A1* | 7/2009 | Cronin et al. | 715/721 |
| 2009/0249208 A1* | 10/2009 | Song et al. | 715/721 |
| 2010/0107126 A1* | 4/2010 | Lin et al. | 715/838 |
| 2010/0274978 A1 | 10/2010 | Koike et al. | |
| 2010/0321406 A1 | 12/2010 | Iwase et al. | |

* cited by examiner

APPARATUS, SYSTEMS AND METHODS FOR A THUMBNAIL-SIZED SCENE INDEX OF MEDIA CONTENT

PRIORITY CLAIM

This patent application is a Continuation of U.S. Non-Provisional patent application Ser. No. 12/903,941, filed Oct. 13, 2010, published as U.S. Publication No. 2012/0093476, and entitled "APPARATUS, SYSTEMS AND METHODS FOR A THUMBNAIL-SIZED SCENE INDEX OF MEDIA CONTENT," the content of which is herein incorporated by reference in its entirety.

BACKGROUND

Media devices, such as a set top box (STB), a stereo, a television, a computer system, or the like, are often configured to receive streaming media content. Such media devices may receive media content from a variety of sources. For example, media content may be provided by a content provider that is sourcing the media content to the media device over a high capacity media content delivery system, such as a cable-based system, a fiber optic-based system, or a satellite-based system. Another exemplary source of media content is a portable memory medium, such as a compact disk (CD), digital video disk (DVD) or the like. Yet another exemplary source is a web site that provides the media content to the media device over a connection, such as the Internet.

As the media content is received, the media device may be configured by a user to store the received media content for later presentation. For example, the media device may have, or be coupled to, a digital video recorder (DVR) or other suitable media content storage systems. Accordingly, at a later time, the user may access the stored media content for presentation.

However, it may be relatively difficult for the user to appreciate the nature of the stored media content, other than by available meta data such as the media content title, actor identities, content descriptor, and/or one or more selected scene images. Furthermore, if the user is interested in initiating playback of the media content at a particular scene, there is no convenient way for the user to access the media content at the desired location of the scene of interest. In such situations, the user would initiate playback of the media content from the start of the media content, and then use a fast forward, skip ahead, or other playback features to advance through the media content to a scene where the user wishes to initiate or resume the playback of the media content.

In another situation, the user may be watching media content such as a movie or a television program. At some point, the user may fall asleep or may be otherwise distracted. However, the user may not have paused presentation during play of the media content. In this situation, it is relatively difficult for the user to return or rewind back to the scene where they stopped viewing the media content. Further, it may be relatively difficult for the user to precisely recall where they stopped viewing the presented media content.

Accordingly, there is a need in the arts to provide a more user-friendly way to enable a user to initiate or resume playback of selected media content at a desired location in the media content.

SUMMARY

Systems and methods of accessing a program at a scene corresponding to a selected thumbnail-sized image are disclosed. An exemplary embodiment selects a plurality of image frames from a program based upon a scene separation duration; generates a thumbnail-sized image from each of the selected image frames, and presents the plurality of thumbnail-sized images on a scene index. The scene index is configured to present the plurality of thumbnail-sized images in a time ordered sequence corresponding to a subject matter presentation sequence of the program, and each of the selected image frames are temporally separated from each other by the scene separation duration.

BRIEF DESCRIPTION OF THE DRAWINGS

Preferred and alternative embodiments are described in detail below with reference to the following drawings.

DETAILED DESCRIPTION

Figure 1:
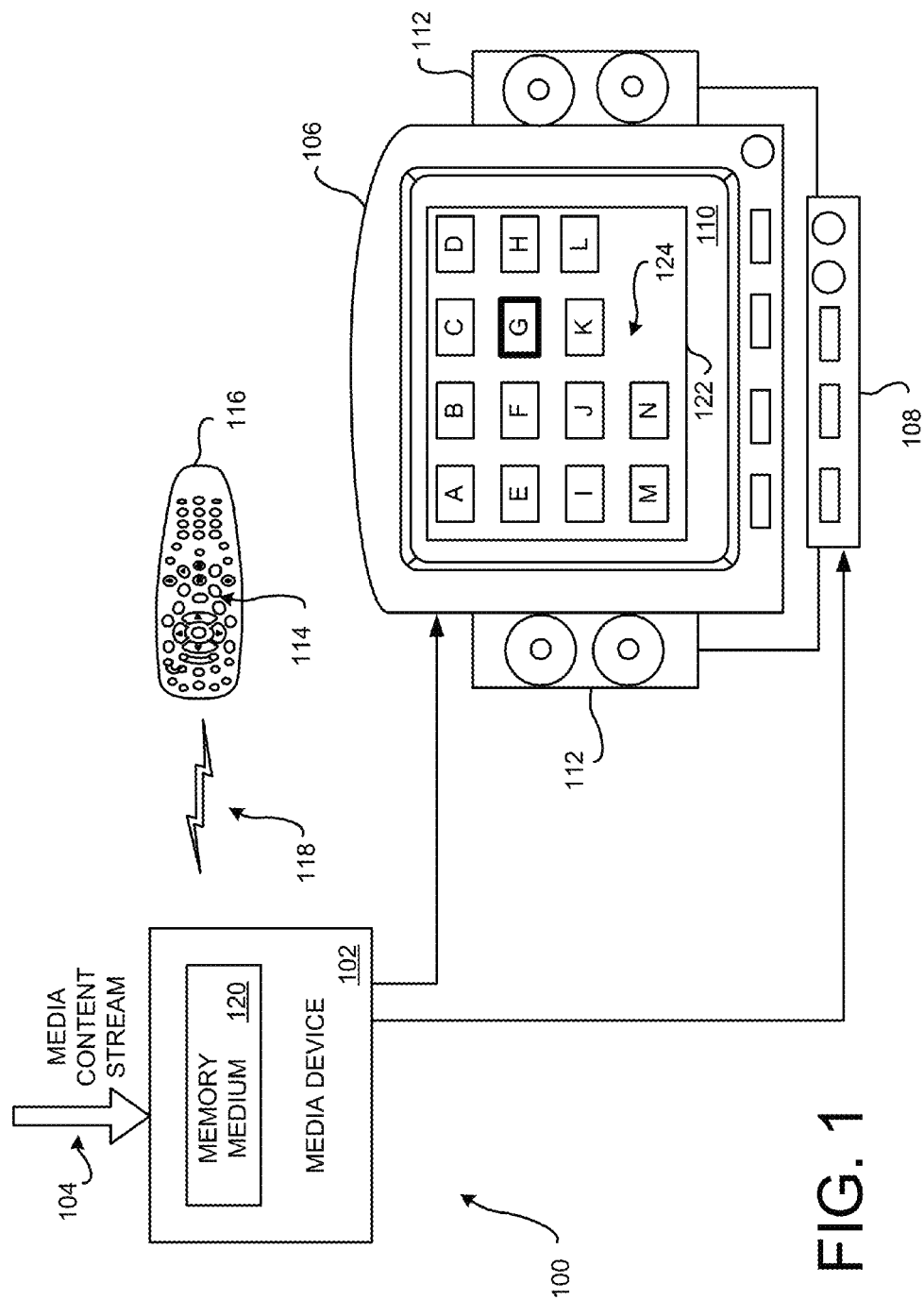
FIG. 1 is a block diagram of an embodiment of a media content scene index system.

FIG. 1 is a block diagram of an embodiment of a media content scene index system 100. Embodiments of the media content scene index system 100 may be implemented in a media device 102 that is configured to receive a media content stream 104. An exemplary media device 102 may include, but is not limited to, a set top box (STB), a digital video disc (DVD) player, a digital video recorder (DVR), a game playing device, a mobile device (such as a tablet computer, smart phone or the like), a personal computer (PC) or any other suitable electronic device. The media content stream 104 may comprise one or more streaming types of media content. Exemplary media content streams 104 may include various types of programs, such as movies, local programming, or special event programs.

In an exemplary media environment, the media device 102 is illustrated as an STB that is coupled to a media presentation system, such as the exemplary television (TV) 106 and a surround sound receiver 108. The user may watch the video portion of the presented media content on the display 110 of the TV 106, and listen to the audio portion of the currently presented media content that is reproduced as sounds by the speakers 112 of the surround sound receiver 108. The user may remotely operate the media device 102, the TV 106, and/or the surround sound receiver 108 by actuating one or more of a plurality of controllers 114 on a remote control 116. The remote control 116 emits a wireless signal 118 that is received by the media device 102, the TV 106, and/or the surround sound receiver 108. When an operating command in the wireless signal 118 is received, the controlled device becomes reconfigured to operate in accordance with the received operating command. For example, the user may actuate one or more of the controllers 114 to cause the media device 102 to retrieve and present a stored program of interest from a local memory medium 120 and/or remotely accessible memory medium.

Embodiments of the media content scene index system 100 are configured to automatically select a time-ordered series of still images and/or short duration video clips that correspond to selected scenes in the subject matter presentation sequence of a selected program of interest. Each of the still images and/or video clips are separated temporally from each other by a suitable scene separation duration. Accordingly, the time-ordered series of still images and/or video clips, each corresponding to a scene of the program, substantially span the duration of the selected program of interest.

The selected still images and/or video clips are processed into a smaller "thumbnail" sized still image and/or video clip. The plurality of thumbnail-sized still images and/or video clips are presented on a scene index 122. The scene index 122 is configured to present the plurality of thumbnail-sized images and/or video clips in a time ordered sequence corresponding to the subject matter presentation sequence of the selected program of interest.

The exemplary scene index 122 of FIG. 1 presents fourteen thumbnail-sized still images and/or video clips (denoted as blocks labeled "A" through "N"). Each of the thumbnail-sized still images and/or video clips A-N correspond to a particular scene in the selected program of interest. The scenes of the thumbnail-sized still images and/or video clips A-N are separated from each other by a suitable duration. Accordingly, the time-ordered series of presented thumbnail-sized still images and/or video clips span a portion of, or all of, the selected program of interest. For example, the first presented thumbnail "A" corresponds to the start of the selected program of interest. The last presented thumbnail "N" corresponds to the conclusion of the selected program of interest.

Upon viewing the time-ordered series of thumbnail-sized still images and/or video clips presented on the scene index 122, the user comprehends the general subject matter of the presented scenes of the selected program of interest. Since the thumbnail-sized still images and/or video clips span a substantial portion of (or all of) the duration of the selected program of interest, the user will also appreciate the subject matter presentation sequence of the selected program of interest.

Additionally, the user viewing the presented scene index 122 comprehends that each of the presented series of thumbnail-sized still images and/or video clips are temporally separated from each other by the scene separation duration. In an exemplary embodiment that presents all of the thumbnail-sized still images and/or video clips generated for the selected program of interest, the user is able to estimate the time span between each of the thumbnail-sized still images and/or video clips based on the number of presented thumbnail-sized still images and/or video clips in the scene index 122. Further, the user will also appreciate the temporal relationship of the presented subject matter of the selected program of interest since each of the thumbnail-sized still images and/or video clips presents a time-ordered series of scenes in the selected program of interest.

For example, if the selected program of interest is a two hour long program, and fourteen thumbnail-sized still images and/or video clips A-N are presented in the scene index 122 that are approximately separated from each other by the same scene separation duration, the user can estimate that the separation between each of the thumbnail-sized still images and/or video clips A-N is approximately nine to ten minutes. (That is, a 120 minute movie with fourteen thumbnail-sized still images and/or video clips results in an approximate nine minute duration between each presented thumbnail 124.) An exemplary embodiment may indicate the scene separation duration on the scene index 122 so that the user is expressly informed of the scene separation duration between each of the presented thumbnail-sized still images and/or video clips.

In the exemplary embodiment of FIG. 1, the scene index 122 is presented as a graphical user interface (GUI) that is interactive with the user. The user, via their remote control 116 that is in communication with the media device 102, is able to interactively "scroll" or "navigate" about the scene index 122 to highlight or otherwise indicate one of the thumbnail-sized still images and/or video clips presented on the scene index 122. When the user selects the highlighted or indicated one of the thumbnail-sized still images and/or video clips corresponding to a scene of interest, presentation of the selected program of interest is initiated or resumed at the scene that generally corresponds to the selected thumbnail-sized still image and/or video clip.

In practice, each of the thumbnail-sized still images and/or video clips is associated with a corresponding playback starting point in the selected program of interest. Upon selection of one of the thumbnail-sized still images and/or video clips, embodiments identify the location of the associated playback starting point in the selected program of interest based upon the selected thumbnail-sized still image and/or video clip. The selected program of interest is retrieved from the memory medium 120, or another suitable memory medium, and presentation of the selected program of interest is initiated or resumed at the location of the playback starting point. That is, presentation is initiated or resumed at the scene corresponding to the selected one of the thumbnail-sized still images and/or video clips presented in the scene index 122.

To illustrate operation of an exemplary embodiment of the media content scene index system 100, the user may be watching a program of interest, such as a movie or the like, that has been previously stored, or that is currently being stored, in the memory medium 120. At some point during presentation of the program of interest, the user may fall asleep or otherwise become distracted so as to miss all of, or a part of, the remaining portion of the presented program. Later, after the user awakes (or at some other time), the user may wish to resume presentation of the program of interest at a scene that generally corresponds to when they fell asleep (or at least at a scene where they are not able to recall the presented subject matter of the program).

If presentation of the program of interest has concluded and the program of interest has been stored, the user accesses the memory medium 120 and selects the program of interest for presentation. In an exemplary embodiment, upon selection of the program of interest for presentation, the media content scene index system 100 is invoked so that the scene index 122 is presented to the user. Alternatively, the scene index 122 may be presented in response to a user request.

The user, upon viewing the thumbnail-sized still images and/or video clips presented on the scene index 122, is able to comprehend the scene sequence of the selected program of interest. The user may then navigate to a particular one of the thumbnail-sized still images and/or video clips where they wish to have presentation initiated or resumed. Upon selection of that particular thumbnail-sized still image and/or video clip, the selected program of interest is retrieved from the memory medium 120 and a corresponding playback starting point location in the selected program of interest is identified. Presentation of the selected program of interest begins at the identified playback starting point.

In another situation, presentation of the program of interest may not have yet concluded. When the user awakes or otherwise returns to their viewing of the program of interest, the user may wish to rewind the program of interest to a scene that generally corresponds to when they fell asleep (or at least at a scene where they are able to recall the presented subject matter). When the media content scene index system 100 is invoked by the user, a scene index 122 is presented that includes those thumbnail-sized still images and/or video clips that are available up to the extent of the currently presented scene of the program of interest. For example, if the currently presented program of interest is a two hour movie, and the movie is half way through its presentation (i.e., one hour), then the exemplary scene index 122 of FIG. 1 would present only those thumbnail-sized still images and/or video clips that correspond to the first hour of the movie. That is, the thumbnail-sized still images and/or video clips A-H would be presented on the scene index 122. (The thumbnail-sized still images and/or video clips I-N would not be presented since they have not yet been generated by the media content scene index system 100.)

To further describe operation of the exemplary scene index 122 illustrated in FIG. 1, the thumbnail-sized still image and/or video clip G has been highlighted (conceptually indicated by a bold lined block G) by the user who has navigated about the scene index 122. Upon selection of the thumbnail-sized still image and/or video clip G, presentation of the program begins or is resumed at the playback starting point that generally corresponds to a location in the selected program of interest where the thumbnail-sized still image and/or video clip G was generated. Since the thumbnail-sized still image and/or video clip G is the seventh thumbnail of the fourteen thumbnails, the user appreciates that presentation of the program will begin or will resume at the scene that generally corresponds to the midway point of the selected program of interest.

Figure 2:
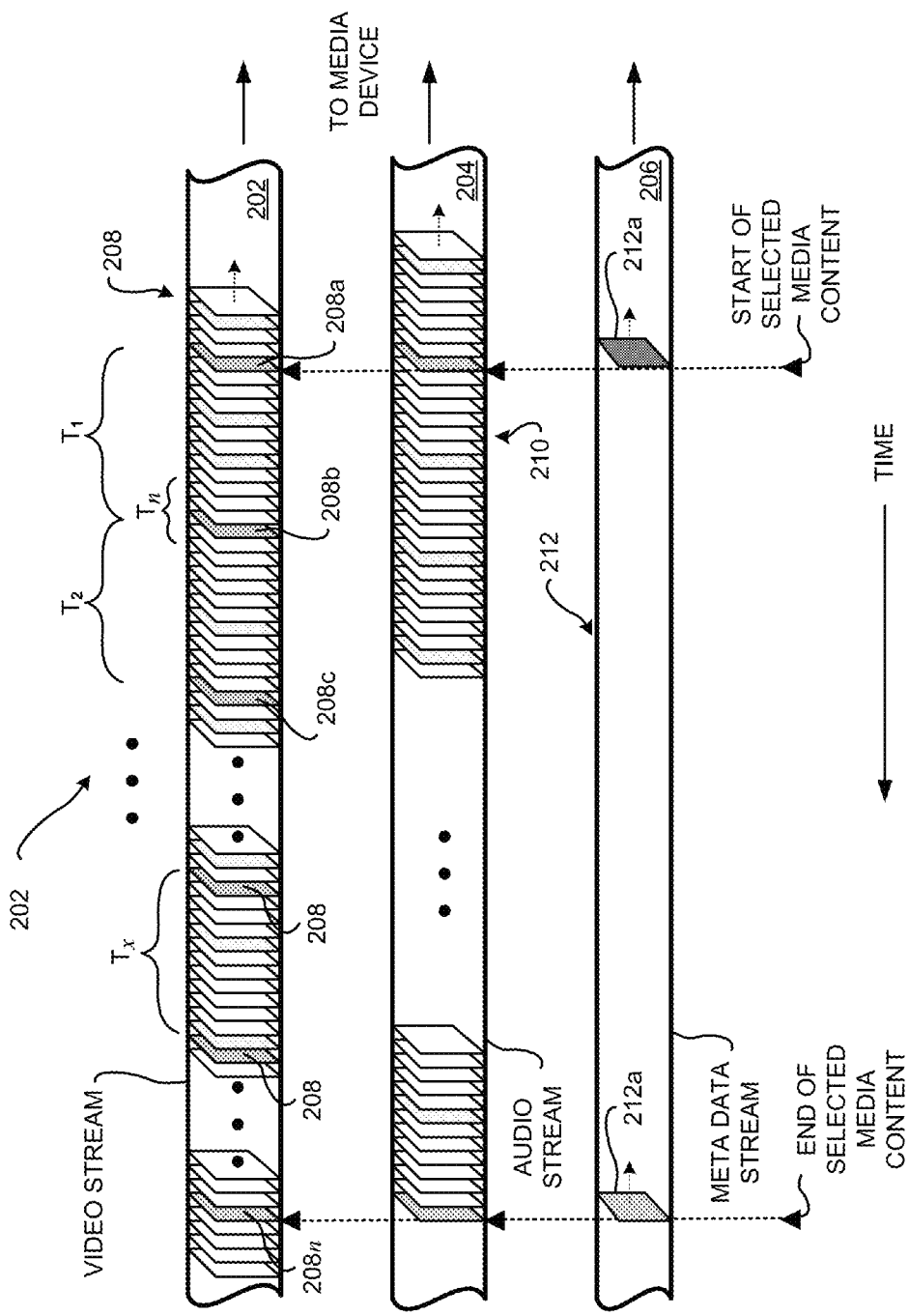
FIG. 2 conceptually illustrates portions of an exemplary media content stream delivered to a media device.

FIG. 2 conceptually illustrates an exemplary media content stream 104 that is received by the media device 102. The media content stream 104 comprises a series of programs. An exemplary program may include, but is not limited to, a television program, a newscast, a broadcast sports event, a movie, or the like. The exemplary media content stream 104 is illustrated as comprising a video stream portion 202, an audio stream portion 204, and an optional meta data stream portion 206.

The conceptualized video stream portion 202 comprises a series of serially communicated image frames 208. Each of the image frames corresponds to a scene image of the program. For example, if the motion pictures expert group (MPEG) format is used, the image frames 208 may be configured as a series of I-frames, P-frames and/or B-frames. The image frames 208 may be received at the media device 102 in a digital data package multiplexed into the media content stream 104.

The audio stream portion 204 may also be communicated as digital data, here conceptually illustrated as discrete audio packets 210, that is processed and assembled into an audio stream. Presentation of the audio portion of the currently presented program is coordinated with the presentation of the associated image frames 208.

Optionally, a meta data stream portion 206 may be included in the media content stream 104. The information in the meta data stream portion 206 is conceptually illustrated as discrete meta data information packets 212. Information in the meta data information packets 212 includes information of interest, such as a channel or station identifier that is providing the media content stream 104. Alternatively, or additionally, information in the meta data information packet 212 may also include information pertaining to other characteristics of each particular program. For example, a first meta data information packet 212*a* may indicate, in part, the beginning of the program and/or a duration of the program. A last meta data information packet 212*b* may indicate a conclusion of the program.

Exemplary embodiments are configured to access or otherwise retrieve the program of interest from the memory medium 120 (or another suitable memory medium) to determine a duration of the stored program. In an exemplary embodiment, the duration of the program of interest may be determined based upon information in the exemplary discrete meta data information packet 212*a*. For example, the discrete meta data information packet 212*a* may specify the program duration. Alternatively, or additionally, the discrete meta data information packet 212*a* may specify a starting time of the program. The program duration may be determined if the last exemplary discrete meta data information packet 212*b* indicates the conclusion time of the program.

The program duration may be determined in other manners. For example, the program duration may be specified in or determined from electronic program guide (EPG) information or the like. Or, the program duration may be determined from the number of image frames 208 in the program and the image frame presentation rate used during presentation of the program.

Since the program duration is known or determinable, the scene separation duration between each of the time-ordered series of still images and/or video clips may be determined by an exemplary embodiment of the media content scene index system 100. An exemplary embodiment determines the scene separation duration based upon the program duration and a desired number of thumbnail-sized still images and/or video clips that will be presented in the scene index 122. For example, if a desired number "x" of still images and/or video clips are to be presented in the scene index 122, then dividing the duration of the selected program of interest by the predefined number "x" determines the scene separation duration between the individual thumbnail-sized still images and/or video clips presented in the scene index 122.

In some embodiments, the scene separation durations are equal or are substantially equal. Alternatively, the scene separation durations may vary. For example, but not limited to, a scene separation duration may be adjusted so as not to fall onto a commercial or the like that is not a scene of the selected program of interest. Alternatively, or additionally, the scene separation durations may be decreased when the amount of activity in that portion of the selected program of interest is relatively great, and/or may be increased when the amount of activity is relatively slow. Alternatively, or additionally, the user may specify the scene separation duration.

In an exemplary embodiment, once the scene separation duration has been determined, a first image frame 208*a* of the selected program of interest is retrieved from the memory medium 120. This first image frame 208*a* is at, or is near, the beginning of the selected program of interest. The selected first image frame 208*a* is used to generate a first thumbnail-sized still image that is presented on the scene index 122. Accordingly, the generated thumbnail-sized still image corresponds to a scene image of the program. Any suitable image frame size reduction method may be used in the various embodiments to generate a thumbnail-sized still image from the selected image frame.

The selected first image frame 208*a* may be the very first image frame of the selected program of interest. Alternatively, the first image frame 208 may occur after the start of the selected program of interest so that a more relevant scene may be presented to the user. For example, if a textual character recognition algorithm is incorporated into or used by an embodiment of the media content scene index system 100, a first image frame 208 having text indicating the title of the selected program of interest may be selected as the first image frame 208*a*.

Alternatively, given the presumption that the user already knows the title of the selected program of interest, the first image frame 208a may be selected based upon some other characteristic of the selected program of interest. For example, but not limited to, a voice recognition algorithm may be used to identify a scene with dialogue. Accordingly, the scene with dialogue may be selected as the first image frame 208a.

As another example, a face recognition algorithm and/or an object recognition algorithm may be used to identify a scene with actors, landscape, buildings, or other features. The scene with the recognized feature may be selected as the first image frame 208a.

As yet another example, a color palate algorithm may be used to identify a scene with many colors therein, and/or to identify a transition between scenes with relatively few colors to a scene with many colors. For example, image frames 208 at the beginning of the selected program of interest typically present text on a solid colored background, such as may occur during the initial portion of the selected program of interest where the program title and/or opening credits are presented. Such title and opening credit scenes would typically have a relatively small number of different colors. In contrast, the photographed scenes of the selected program of interest will typically have many different colors therein. Accordingly, the scene with many colors, or where a transition from relatively few colors to many colors occurs, may be selected as the first image frame 208a.

Additionally, or alternatively, an edge detection algorithm may be used to identify the amount of scene activity. For example, the initial image frames 208 presenting at the program title and/or opening credits typically may not have a lot of edges, or may not have edges therein that are significantly moving from one image frame to the next. In contrast, photographed scenes of the selected program of interest will typically have more edges, and/or may have faster moving edges. Accordingly, the scene with more edges and/or faster moving edges may be selected as the first image frame 208a.

Based on the determined (or predefined) scene separation duration, a second image frame 208b is selected. The second image frame 208b is at or near the end of the first scene separation duration ($T_1$) [or is at or near the beginning of the second scene separation duration ($T_2$)]. The selected second image frame 208b is used to generate the second thumbnail-sized still image presented in the scene index 122. Similarly, a third image frame 208c is selected that is at or near the end of the second scene separation duration ($T_2$) [or that is at or near the beginning of the third scene separation duration ($T_3$)]. The selected third image frame 208c is used to generate the third thumbnail-sized still image presented in the scene index 122. The process of selecting subsequent ones of the image frames 208, based on the determined (or predefined) scene separation duration continues until the conclusion of the selected program of interest is reached.

As each of the image frames 208 are selected, some embodiments are configured to evaluate the image frames about the start of (or end of) each scene separation duration. That is, the particular image frame 208 that falls exactly on the start of (or end of) a scene separation duration may not be a scene that presents particularly relevant information to the user. For example, a black scene, a blurred scene, or the like may be used to separate or facilitate transition between different scenes in the program. Such a transition scene would not impart a significant amount of subject matter information to the user and would not be particularly desirable for generation of a thumbnail-sized still image that is presented in the scene index 122.

In some situations, the selected image frame 208 may not have sufficient information to construct a complete scene image. For example, if the motion pictures expert group (MPEG) format is used, the image frames 208 may be configured as a series of I-frames, P-frames and/or B-frames. The P-frames and/or B-frames may not have sufficient information. Accordingly, one of the adjacent I-frames is selected as the image frame from which a thumbnail-sized still image is generated. If a video clip is to be generated, then an I-frame will be selected as the first image frame that is used to generate the video clip.

Since a particular selected image frame 208 may not provide a very desirable scene image, some embodiments are configured to evaluate one or more characteristics of a candidate image frame 208. Exemplary embodiment may employ a text character recognition algorithm to identify text, a voice recognition algorithm to evaluate one or more audio characteristics, a face recognition algorithm and/or an object recognition algorithm to evaluate one or more scene characteristics, a color palate algorithm to evaluate one or more color characteristics, and/or an edge detection algorithm to evaluate one or more edge characteristics. Depending upon the nature of the characteristic, that particular image frame may be identified as an unsuitable candidate. A "best" one of the image frames may then be identified and selected as the image frame that is used to generate the thumbnail-sized still image.

In some embodiments, a thumbnail-sized short video clip is generated for presentation in the scene index 122. When a short thumbnail-sized video clip is generated, a group of image frames 208 in proximity to the start of (or end of) each of the scene separation durations ($T_x$) are selected. The number of selected image frames 208 corresponds to a duration of the generated thumbnail-sized video clip. The thumbnail-sized short duration video clips are then generated from the selected groups of the image frames 208.

The duration of the thumbnail-sized short duration video clips are sufficiently long so as to present enough video information to the user so that the user comprehends at least the general subject matter of the video clip. In an exemplary embodiment, the duration of the video clip ($T_n$) may be predefined in an exemplary embodiment. For example, but not limited to, the duration ($T_n$) may be predefined to be ten seconds. Accordingly, a number of image frames 208 corresponding to a ten second video can be determined so that when the group of image frames 208 are selected and used to generate a corresponding thumbnail-sized video clip, the duration of the thumbnail-sized video clip is ten seconds. In an exemplary embodiment, after conclusion of the presentation of the thumbnail-sized short duration video clip, presentation of the thumbnail-sized short duration video clip loops back to the beginning so that the thumbnail-sized short duration video clip is continuously presented on the scene index 122 in a looped manner.

Figure 3:
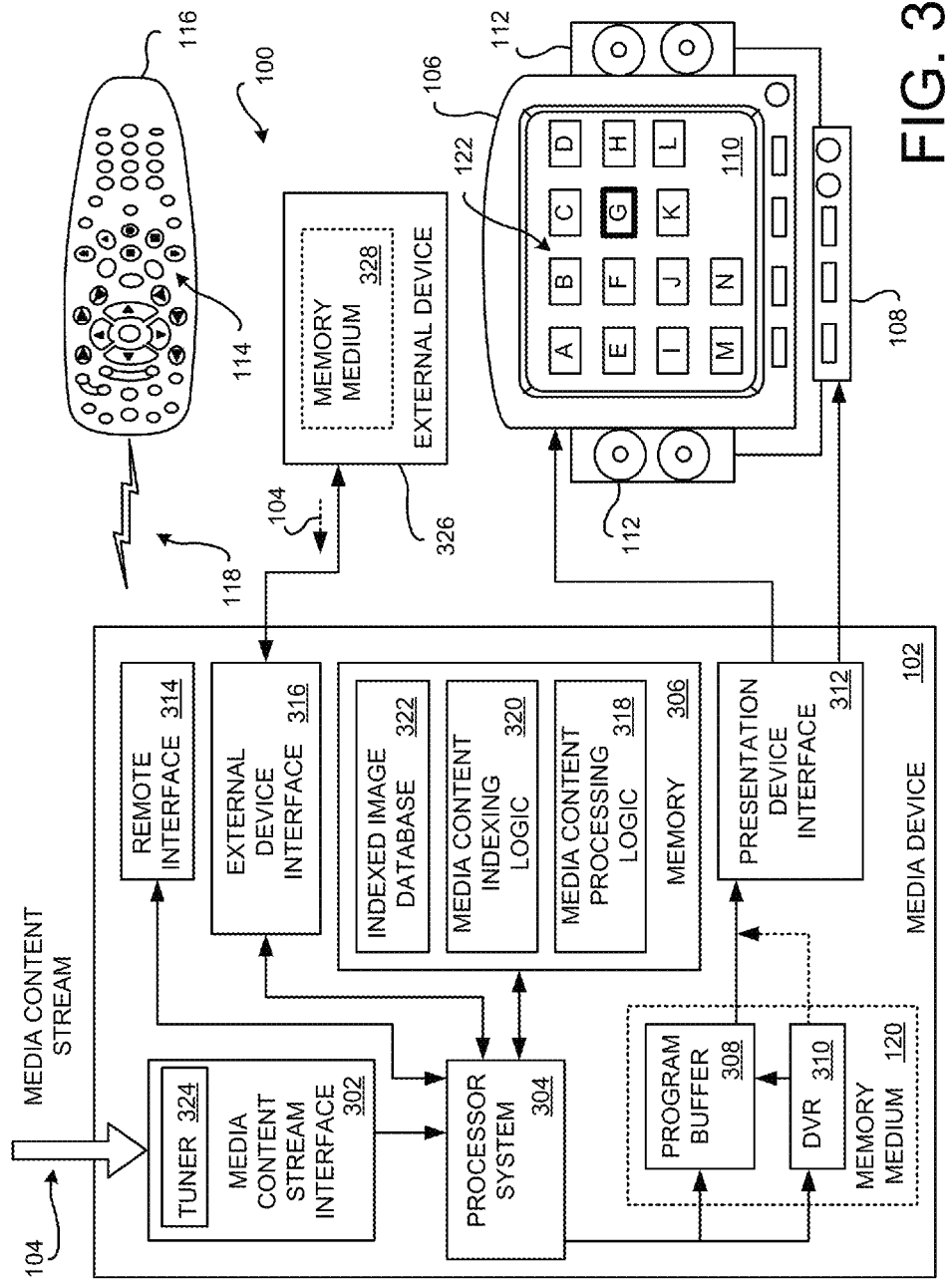
FIG. 3 is a block diagram of an embodiment of the media content scene index system implemented in a set top box (STB)

FIG. 3 is a block diagram of an embodiment of the media content scene index system 100 implemented in a media device 102 corresponding to a set top box (STB) that is configured to receive media content from a media content provider. The non-limiting exemplary media device 102 comprises a media content stream interface 302, a processor system 304, a memory 306, a program buffer 308, an optional digital video recorder (DVR) 310, a presentation device interface 312, a remote interface 314, and an optional external device interface 316. The memory 306 comprises portions for storing the media content processing logic 318, the media content indexing logic 320, and an optional indexed image database 322. In some embodiments, the media content processing logic 318 and/or the media content indexing logic 320 may be integrated together, and/or may be integrated with other logic. Other media devices may include some, or may omit some, of the above-described media processing components. Further, additional components not described herein may be included in alternative embodiments.

The functionality of the media device 102, here a STB, is now broadly described. One or more media content streams 104 are received by the media content stream interface 302. The media content stream 104 is provided to the media device 102 over a media content delivery system (not shown), such as, but not limited to, a satellite system, a cable system, or the Internet. The media content delivery system is coupled to the media device at the media content stream interface 302.

The processor system 304, executing the content processing logic 318, and based upon a request for a program of interest specified by a user, tunes one of the tuners 324 in the media content stream interface 302 to one of the media content streams 104 that is providing the requested program of interest. The media content received in the media content stream 104 is then assembled into the video stream portion 202 (comprising the image frames 208) and/or the audio stream portion 204 (FIG. 2). The stream of video and audio information may then be stored by the program buffer 308 such that the media content can be streamed out to the media presentation device, such as the TV 106 and/or the surround sound receiver 108, via the presentation device interface 312. Alternatively, or additionally, the media content may be saved into the DVR 310 for later presentation.

In an exemplary embodiment, in response to selection of a program of interest by the user, operation of media content scene index system 100 is invoked. The processor system 304 loads and executes the media content indexing logic 318 so that the stored selected program of interest is accessed from the DVR 310, wherein still images and/or video clips are selected. The thumbnail-sized still images and/or video clips are then generated based upon the selected still images and/or video clips.

The optional indexed image database 322 is configured to store the generated thumbnail-sized still images and/or video clips. Alternatively, or additionally, the DVR 310 may be configured to store the thumbnail-sized still images and/or the video clips selected from a program that is processed by the media content scene index system 100.

In an alternative embodiment, the selected still images and/or video clips are saved into the indexed image data base 322 or in another suitable memory medium, such as the DVR 310. When the scene index 122 is presented to the user, the saved time-ordered series of still images and/or video clips are then retrieved, and the thumbnail-sized still images and/or video clips are generated therefrom. The generated thumbnail-sized still images and/or video clips are then presented in the scene index 122.

In some instances, the entirety of the selected program of interest may not have yet been received in the media content stream 104 and/or stored into the DVR 310. That is, the remaining portion of the selected program of interest may still be in the process of being received by the media device 102. In such instances, a previously received portion of the selected program of interest residing in the program buffer 308 and/or the DVR 310 may be accessed to select still images and/or video clips. The thumbnail-sized still images and/or video clips for the received portion of the program of interest are then generated and presented in the scene index 122. As additional media content is received, additional still images and/or video clips may be identified and selected, and corresponding thumbnail-sized still images and/or video clips may be generated therefrom.

In some situations, the selected program of interest may be accessed from an external device 326 that is communicatively coupled to the media device 102, via the external device interface 316. For example, but not limited to, the external device may be a DVD player or another electronic device that is configured to access the selected program of interest from a persistent memory medium that is storing the selected program of interest. As another example, the external device 326 may be a personal computer or other device that accesses the selected program of interest from another source, such as a web site or the like. In this situation, the external device 326 accesses the memory media 328 on which the selected program of interest resides.

In some embodiments, the processing of the selected program of interest to generate the time-ordered series of thumbnail-sized still images and/or video clips occurs in response to specification of the selected program of interest by the user. Processing the program of interest may require some noticeable duration before the scene index 122 is presented to the user. Accordingly, some embodiments are configured to continue presentation of a currently presented program until the processing of the program of interest is completed. Other embodiments may switch to presentation of the selected program of interest at some predefined point, such as at the beginning of the selected program of interest, at the last viewed scene in the selected program of interest, or at any other suitable scene. Some embodiments may present a selected still image of, or related to, the selected program of interest. Other embodiments may simply present a notification image indicating to the user that the processing of the selected program of interest is underway.

Some embodiments may be configured to generate and save the thumbnail-sized still images and/or video clips (or alternatively, select and save the full sized still images and/or video clips from which the thumbnails are generated) as selected programs are received, or as selected programs are saved into the DVR 310 or into another memory medium, such as the memory medium 328 of the external device 326. It is often the case that a program of interest is saved when it is received in the media content stream 104 at a time when the user is not able to view the program. Accordingly, when the user is initially presented the scene index 122, the thumbnail-sized still images and/or video clips (and/or their full sized still images and/or video clips from which the thumbnails are generated) are already available for quicker access.

In this situation, a predefined scene separation duration is used to identify and select the still images and/or video clips. For example, with a predefined scene separation duration of ten minutes, a sixty minute program would have a still image and/or video clip selected every ten minutes until the conclusion of the program of interest. Here, seven full sized still images and/or video clips will be selected (and/or seven thumbnail-sized still images and/or video clips will be generated and saved). If the scene index 122 is presented prior to completion of the processing, the plurality of thumbnail-sized still images and/or video clips are presented in a time ordered sequence up to a current presentation point of the program of interest.

Alternatively, or additionally, some embodiments may generate and save the time-ordered series of thumbnail-sized still images and/or video clips (and/or their full sized still images and/or video clips from which the thumbnails are generated) as the program is being received from a remote source, such as a video on demand (VOD) system. Here, the embodiment would use a predefined scene separation duration. Alternatively, the scene separation duration may be defined based upon the known duration of the program of interest that is received from the VOD system.

Some embodiments may be configured to indicate the source of the stored media content to the user. For example, if the source of the stored media content is the local DVR 310, then the user will appreciate that upon selection of a particular thumbnail-sized still images and/or video clips from the scene index 122, presentation will begin with little or no delay. In contrast, if the source of the stored media content is the external memory medium 318, then the user will appreciate that upon selection of a particular thumbnail-sized still image and/or video clip, there may be a delay in the presentation of the media content. In such situations, the user may make a more informed choice, such as by electing to access the media content from another source and/or at a later time.

For example, the media content may have to be remotely accessed, processed, and then streamed to the media device 102. In some system, such as a peer-to-peer network or client-server architecture, the media content may require a relatively large amount of processing time to generate a stream of media content that is suitable for transmission to the media device 102.

Figure 4:
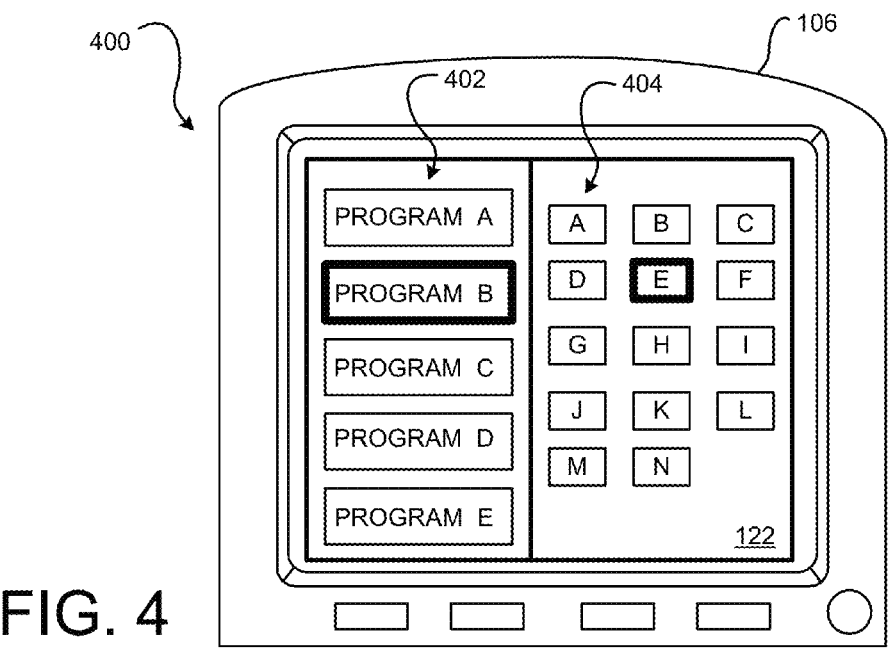
FIGS. 4-8 are simplified screen shots illustrating various exemplary alternative scene indexes generated by various embodiments of the media content scene index system.

FIG. 4 is a simplified screen shot illustrating an exemplary alternative scene index 400 generated by an embodiment of the media content scene index system 100. The exemplary scene index 400 includes a first portion 402 and a second portion 404.

This first portion 402 presents a program listing. The program listing presents a series of programs A-E that are available for presentation, such as programs that have been locally stored on the DVR 310 (FIG. 3), or that are available from the memory media 328 or a VOD system. (In an exemplary embodiment, the displayed text may correspond to the program title and/or may provide additional information, such as a subject matter descriptor, a recording date, an original presentation date, a program series identifier, or the like.) The second portion 404 presents the time-ordered series of thumbnail-sized still images and/or video clips associated with the currently highlighted one of the listed programs.

The first portion 402 of the scene index 400 is configured so that the user may initially navigate (such as by scrolling up or down) to one of the listed programs. When one of the programs is suitably highlighted or otherwise identified, the thumbnail-sized still images and/or video clips associated with that particular program are presented in the second portion 404 of the scene index 400. To demonstrate, the "Program B" listed in the first portion 402 of the scene index 400 is illustrated as being the highlighted or otherwise identified program of interest, as denoted by the bold lined box. Thus, the presented thumbnail-sized still images and/or video clips are understood by the user to be scenes selected from Program B.

The second portion 404 of the scene index 400 is configured so that the user may then navigate (such as by scrolling up, down, left and/or right) to a particular one of the time-ordered series of thumbnail-sized still images and/or video clips. For example, the thumbnail-sized still image and/or video clip denoted as "E" is illustrated as being highlighted or otherwise identified. Accordingly, if the user selects the "E" thumbnail-sized still image and/or video clip, presentation of the associated program (here "Program B") will begin at the scene that corresponds to the selected "E" thumbnail-sized still image and/or video clip.

The exemplary scene index 400 is particularly suited for assisting a user to identify and navigate to a particular scene of interest in a series of related program episodes. For example, but not limited to, a weekly television series may be stored, or may be otherwise accessible, at the media device 102. For example, the "Program B" might be the second program episode of the current season of the television series having Programs A-E currently available for viewing. (If additional episodes are available, they may be accessed on one or more continuing pages of the scene index 400). The user, upon a review of the presented thumbnail-sized still images and/or video clips, may realize that they have already viewed that highlighted episode. The user, scrolling to the next episode, could quickly ascertain whether or not they have viewed that episode. Accordingly, the user is able to move about and view the thumbnail-sized still images and/or video clips for a plurality of different episodes, identify an episode of interest, and then have presentation of the selected episode of interest begin at a selected scene of interest (associated with a particular one of the thumbnail-sized still images and/or video clips).

Figure 5:
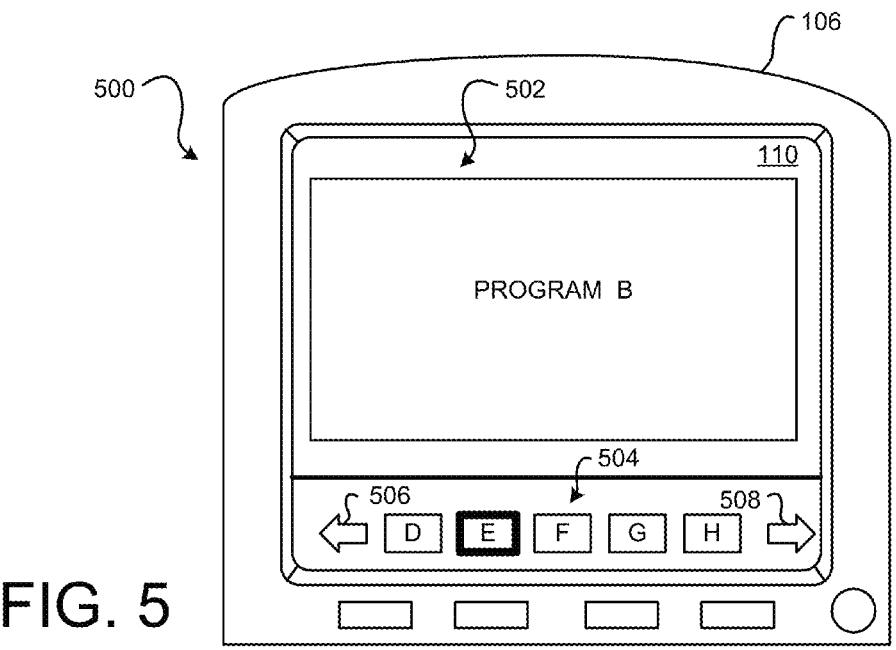

FIG. 5 is a simplified screen shot illustrating an exemplary alternative scene index 500 generated by an embodiment of the media content scene index system 100. The exemplary scene index 500 includes a first portion 502 that presents a full sized, or substantially full sized, video image of the "Program B" that is currently being presented on the display 110 of the TV 106. Optionally, the audio track of the currently presented program may be presented.

The exemplary scene index 500 includes a second portion 504 that presents a portion of the time-ordered series of thumbnail-sized still images and/or video clips associated with the currently presented program. The exemplary second portion 504 is configured as a horizontal banner with a single row of thumbnail-sized still images and/or video clips that is presented below the portion 502. Alternative embodiments may present multiple rows of thumbnail-sized still images and/or video clips in any suitable format. An alternative embodiment may present the horizontal banner above the first portion 502.

Using this exemplary embodiment, the user is able to view and hear the currently presented program while concurrently viewing the presented plurality of thumbnail-sized still images and/or video clips. The currently presented program shown in the first portion of the scene index 500 may be a presented program that has been previously stored in the DVR 310 (FIG. 3), may be a program accessed from the memory medium 328 by the external device 326, or may be a program currently received in the media content stream 104 or a VOD system.

The thumbnail-sized still images and/or video clips A-C, and any available thumbnail-sized still images and/or video clips that are past the thumbnail-sized still image and/or video clip H, are not shown in the exemplary scene index 500 due to the limited size of the second portion 504 of the scene index 500. A reverse navigation button 506 may, in an exemplary embodiment, be provided so that the user has access to the earlier thumbnail-sized still images and/or video clips A-C. A forward navigation button 508 may be provided so that the user has access to any available thumbnail-sized still images and/or video clips that are past the thumbnail-sized still image and/or video clip H. Using this exemplary embodiment, the user may "jump back" or "jump forward" to a scene in the currently presented program by navigating about the second portion 504 of the scene index 500.

In some instances, the Program B may be in the process of being currently received in the media content stream 104 by the media device 102 (FIGS. 1 and 3). Thus, the last shown thumbnail-sized still image and/or video clip H may correspond to a last generated, and thus a most recent, thumbnail-sized still image and/or video clip. In this instance, the user can navigate about the second portion 504 and select one of the thumbnail-sized still images and/or video clips A-H so that the presentation of Program B "jumps back" to a prior presented scene of interest in Program B. In this exemplary instance, the still image and/or video clip E is highlighted. Accordingly, upon selection of the thumbnail-sized still image and/or video clip E, the presentation of Program B will "jump back" to resume presentation at a scene in Program B that corresponds to the selected thumbnail-sized still image and/or video clip E.

Figure 6:
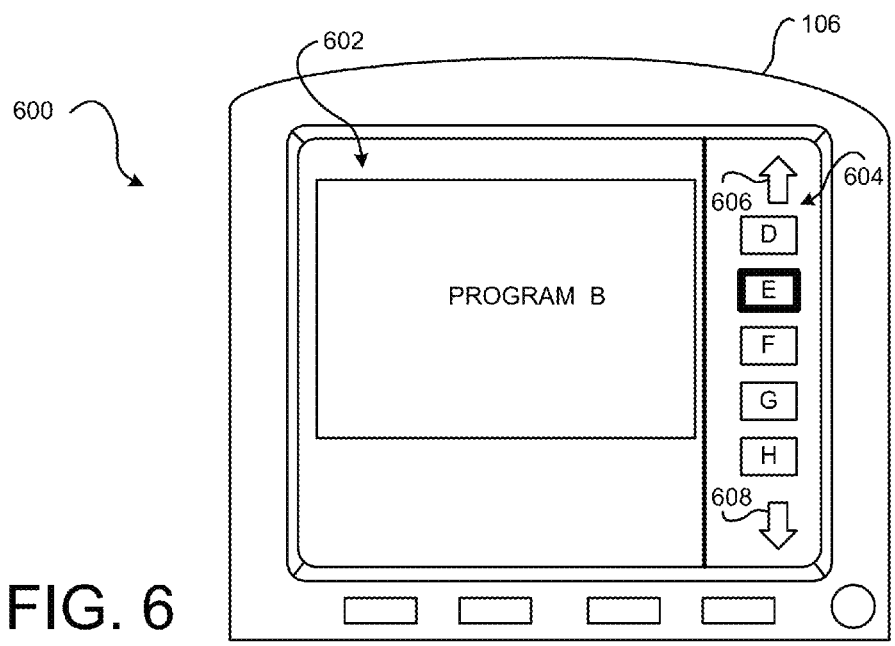

FIG. 6 is a simplified screen shot illustrating an exemplary alternative scene index 600 generated by an embodiment of the media content scene index system 100. This exemplary scene index 600 is similar to the exemplary scene index 500 (FIG. 5). The exemplary scene index 600 includes a first portion 602 that presents a full sized, or substantially full sized, video image of the currently presented program. Optionally, the current audio track of the currently presented program may be presented.

The exemplary scene index 600 also includes a second portion 604 that presents a portion of the time-ordered series of thumbnail-sized still images and/or video clips associated with the currently presented program. The second portion 604 is presented as a vertically oriented banner to the right of the first portion 602. Alternatively, the second portion 604 may be presented as a vertically oriented banner to the left of the first portion 602. With this exemplary embodiment, the user may "jump back" or "jump forward" to a scene in the currently presented program by using the navigation buttons 606, 608 to navigate about the second portion 604 of the scene index 600.

Figure 7:
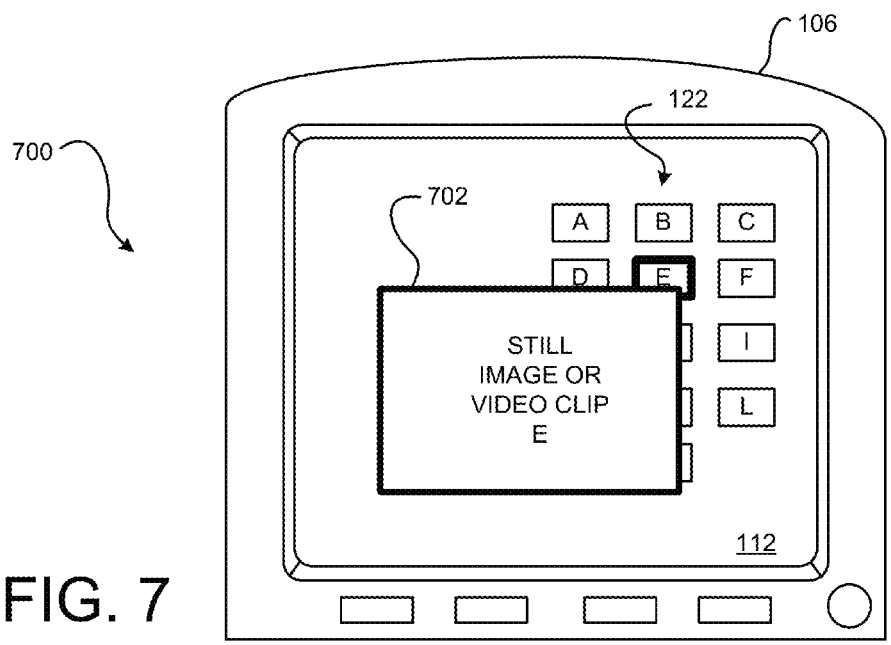

FIG. 7 is a simplified screen shot illustrating an exemplary alternative scene index 700 generated by an embodiment of the media content scene index system 100. This exemplary scene index 700 presents the currently highlighted thumbnail-sized still image and/or video clip as a larger sized still image and/or video clip 702. Thus, the user may readily see greater detail in the scene presented by the currently highlighted thumbnail-sized still image and/or video clip. Here, the thumbnail-sized still image and/or video clip D has been highlighted by the user while navigating about the scene index 700.

In an exemplary embodiment, presentation of the larger sized still image and/or video clip 702 continues until the user initiates some other action. For example, the user may navigate to another one of the thumbnail-sized still images and/or video clips shown in the scene index 122. In this situation, the larger sized still image and/or video clip 702 would be replaced by a currently highlighted one of the thumbnail-sized still images and/or video clips of the scene index 122. If the user initiates some other action, presentation of the larger sized still image and/or video clip 702 ends, and the media device 102 responds to the user initiated action.

Alternatively, or additionally, presentation of the larger sized still image and/or video clip 702 may last for a predefined display duration. After expiration of the display duration, presentation of the larger sized still image and/or video clip 702 ends. For example, when the display duration is five seconds, the larger sized still image and/or video clip 702 is initially presented. After five seconds, presentation of the larger sized still image and/or video clip 702 ends. Some embodiments may use a display duration corresponding to the duration of a currently presented thumbnail-sized video clip.

The exemplary larger sized still image and/or video clip 702 may be used in conjunction with, or integrated with, other scene index embodiments. For example, the larger sized still image and/or video clip 702 may be presented with the selected thumbnail-sized still images and/or video clips of the scene index 122 (FIG. 1).

Figure 8:
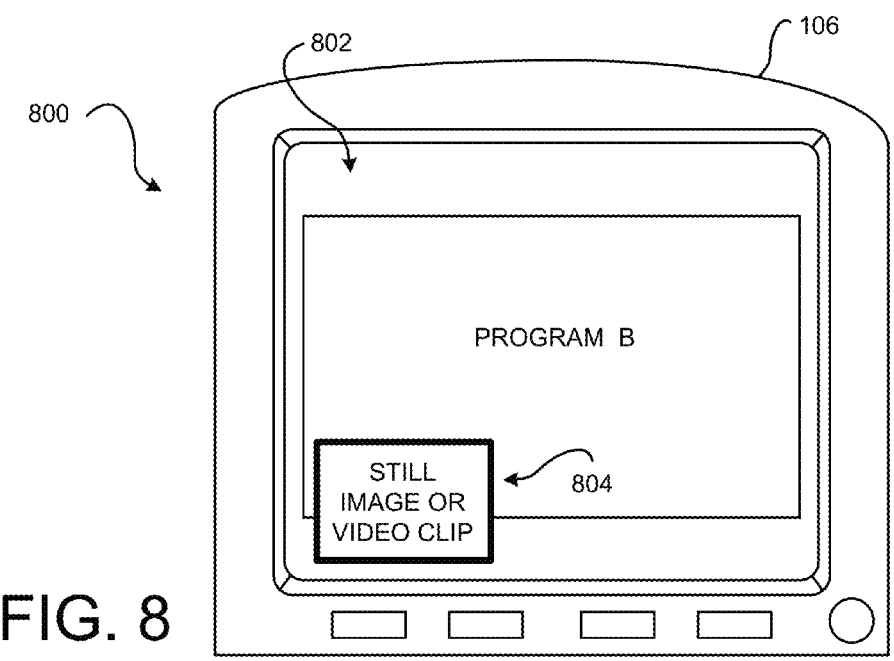

FIG. 8 is a simplified screen shot illustrating an exemplary alternative scene index 800 generated by an embodiment of the media content scene index system 100. The exemplary scene index 800 includes a first portion 802 that presents a full sized, or substantially full sized, video image of the currently presented program. Optionally, the current audio track of the currently presented program may be presented.

The exemplary scene index 800 also includes a second portion 804 that indicates a thumbnail-sized still image and/or video clip associated with the currently presented program that is ahead of, or behind, the currently presented scene of the presented program. The exemplary second portion 804 is configured as a pop-up type image that may be presented in any suitable location of display 110 of the TV 106.

In this exemplary embodiment, the user invokes the media content scene index system 100 to present the next occurring one of the time-ordered series of still images and/or video clips. Alternatively, a previously occurring one of the time-ordered series of still images and/or video clips may be presented in the second portion 804.

For example, the user may be interested in jumping ahead in the presentation of the selected program of interest. Similarly, the user may be interested in jumping back in the presentation of the selected program of interest. By viewing the next occurring one of the time-ordered series of still images and/or video clips going forward or backward, the user will appreciate the nature of the scene that will be forthcoming in the selected program of interest. If the user so chooses, upon selection of the presented next occurring one of the time-ordered series of still images and/or video clips, presentation will jump forward to the scene corresponding to that next occurring one of the time-ordered series of still images and/or video clips.

The exemplary scene index 800 is particularly suited for assisting a user to rapidly advance forward through, or move back through, a currently presented program of interest. For example, generation of the time-ordered series of thumbnail-sized still images and/or video clips may be based upon some predefined scene separation duration, such as every few seconds or minutes. Since the generated thumbnail-sized still images and/or video clips may be previously generated and stored in the indexed image database 322, they may be quickly accessed in a sequential manner and presented in the second portion 804 of the scene index 800. Thus, the user can skip ahead or move backward to find a scene of interest, and then cause the media content scene index system 100 to initiate or resume presentation at the scene of interest identified by the user.

The above-described embodiments present the scene indexes on a presentation device communicatively coupled to the media device 102, such as the exemplary TV 106. Alternatively, or additionally, the scene indexes may be presented on other suitable presentation devices. For example, the scene indexes may be presented on a laptop computer, a personal computer, a cellular phone, a personal device assistant (PDA) or the like.

Some embodiments may be configured to save, archive, and/or communicate a selected one of the thumbnail-sized still images and/or video clips. For example, the user may wish to e-mail one or more selected thumbnail-sized still images and/or video clips to a friend. The friend, upon viewing the communicated thumbnail-sized still images and/or video clips, may then better appreciate the user's experience and thus have a more meaningful discourse regarding the program. Alternatively, or additionally, the friend may choose to initiate viewing of the media content based upon the received thumbnail-sized still images and/or video clips which indicate an approximate location of interest in the media content.

Some embodiments may be further configured, based on the selected scene index 122, to generate a short duration video clip from a selected still image scene index 122. The resulting generated short video clip may also be saved, archived, e-mailed, etc. as described above.

It should be emphasized that the above-described embodiments of the media content scene index system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for indicating program scenes of a program, the method comprising:
    selecting a series of image frames from a plurality of time sequenced image frames, wherein the selected image frames are separated temporally from each other by a scene separation duration, wherein the selecting further comprises for each of the selected image frames:
        evaluating at least one characteristic of the selected image frame,
            wherein when the characteristic is text, the evaluating comprises identifying a scene with text, wherein the evaluated selected image, frame is unsuitable for presentation when the scene with text is identified; and
            wherein when the characteristic is color, the evaluating comprises identifying a scene with a solid colored background, wherein the evaluated selected image frame is unsuitable for presentation when the scene with the solid colored background is identified; and
        selecting another image frame in proximity to the unsuitable selected image frame when the evaluation indicates that the selected image frame is unsuitable for presentation;
    generating a plurality of thumbnail-sized images, wherein one thumbnail-sized image is generated from each of the suitable image frames; and
    presenting the plurality of thumbnail-sized images on a scene index,
    wherein the scene index is configured to present the plurality of thumbnail-sized images in a time ordered sequence corresponding to a subject matter presentation sequence of the program.

2. The method of claim 1, selecting the other image frame in proximity to the unsuitable selected image frame after the evaluation comprises:
    evaluating the at least one characteristic of the selected other image frame, wherein the evaluated characteristic indicates that the selected other image frame is suitable for presentation to the user when the selected other image frame permits the user to comprehend the scene subject matter, and wherein the evaluated characteristic indicates that the selected other image frame is unsuitable for presentation to the user when the selected image frame will not permit the user to comprehend the scene subject matter.

3. The method of claim 1, wherein the selected other image frame is a first other image frame that is unsuitable for presentation to the user, and further comprising:
    selecting a second other image frame in proximity to the unsuitable first other image frame when the evaluation indicates that the first other image frame is unsuitable for presentation,
    wherein the second other image frame is used to generate the corresponding thumbnail-sized image that is used in the scene index.

4. The method of claim 1, wherein the scene index that is configured to present the plurality of thumbnail-sized images in the time ordered sequence comprises a number of thumbnail-sized images that are all presentable at the same time on a display using a plurality of rows of thumbnail-sized images, the method further comprising before selecting the series of image frames:
    determining a duration of the program; and
    determining the scene separation duration based on the number of the plurality of thumbnail-sized images to be presented on the scene index,
    wherein the number of thumbnail-sized images presents a series of scene images that substantially span the duration of the program.

5. The method of claim 1, further comprising:
    receiving the user selection of one of the plurality of thumbnail-sized images;
    identifying in the program a playback starting point corresponding to a start of the scene associated with the selected thumbnail-sized still image; and
    retrieving the program from a memory medium, wherein presentation of the program begins at the playback staring point.

6. The method of claim 1, wherein the evaluated characteristic is a recognized face characteristic, the evaluating comprises:
    identifying a scene with actors when face characteristics are recognized, wherein the evaluated selected image frame is unsuitable for presentation when the scene with no actors is identified.

7. The method of claim 6,
    when the recognized face characteristic is the evaluated characteristic, selecting another image frame comprises:
        serially selecting and evaluating image frames that are in proximity to the evaluated selected image frame that was identified as having the scene with no actors, wherein the selecting and evaluating continues until a scene with actors is identified; and
        selecting the image frame having the scene with actors for generating the plurality of thumbnail-sized images.

8. The method of claim 1, further comprising:
    storing the generated plurality of thumbnail-sized images; and
    retrieving the stored plurality of thumbnail-sized images to present the scene index,
    wherein the retrieving is performed in response to receiving the user selection of the program.

9. The method of claim 1, further comprising:
    storing the selected image frames; and
    retrieving the stored selected image frames to generate the plurality of thumbnail-sized images,
    wherein the retrieving is performed in response to receiving the user selection of the program.

10. The method of claim 1, wherein the program is a first program, wherein the scene index is a first scene index associated with the first program, wherein the plurality of thumbnail-sized images are a plurality of first thumbnail-sized images used in the first scene index, and wherein a second program has a second scene index that includes a plurality of second thumbnail-sized images that have been generated from the second program, the method further comprising:
   presenting an electronic program guide (EPG) on a display, wherein a list of a plurality of programs that are available for presentation is presented on a first portion of the EPG, and wherein the list of the plurality of programs includes the first program and the second program;
   receiving a user instruction that causes one of the first program and the second program to be highlighted on the EPG;
   presenting the first scene index with the plurality of first thumbnail-sized images on a second portion of the EPG in response to receiving the user instruction that highlights the first program; and
   presenting the second scene index with the plurality of second thumbnail-sized images on the second portion of the EPG in response to receiving the user instruction that highlights the second program.

11. The method of claim 1,
when text is the evaluated characteristic, selecting another image frame comprises:
   serially selecting and evaluating image frames that are in proximity to the evaluated selected image frame that was identified as having the scene with the text, wherein the selecting and evaluating continues until a scene with no text is identified; and
   selecting the image frame having the scene with no text for generating the plurality of thumbnail-sized images.

12. The method of claim 1,
when color is the evaluated characteristic, selecting another image frame comprises:
   serially selecting and evaluating image frames that are in proximity to the evaluated selected image frame that was identified as having the scene with the solid colored background, wherein the selecting and evaluating continues until a transition occurs from the scene with the solid colored background to a scene with a plurality of different colors; and
   selecting the image frame having the plurality of different colors for generating the plurality of thumbnail-sized images.

13. The method of claim 1, wherein when the evaluated characteristic is a recognizable object, the evaluating comprises:
   identifying a scene with the recognizable object, wherein the evaluated selected image frame is unsuitable for presentation when the scene with no recognizable object is identified.

14. The method of claim 13,
when the recognizable object is the evaluated characteristic, selecting another image frame comprises:
   serially selecting and evaluating image frames that are in proximity to the evaluated selected image frame that was identified as having the scene with no recognizable object, wherein the selecting and evaluating continues until a scene with the recognizable object is identified; and
   selecting the image frame having the scene with the recognizable object for generating the plurality of thumbnail-sized images.

15. The method of claim 1, wherein when the evaluated characteristic is an audio characteristic, the evaluating comprises:
   identifying a scene with dialogue, wherein the evaluated selected image frame is unsuitable for presentation when the scene with no dialogue is identified.

16. The method of claim 15,
when dialogue is the evaluated characteristic, selecting another image frame comprises:
   serially selecting and evaluating image frames that are in proximity to the evaluated selected image frame that was identified as having the scene with no dialogue, wherein the selecting and evaluating continues until a scene with dialogue is identified; and
   selecting the image frame having the scene with the dialogue for generating the plurality of thumbnail-sized images.

17. A media device, comprising:
an interface configured to receive a program delivered in a media content stream; and
a processor system communicatively coupled to the interface, wherein the processor system is operable to:
   select a plurality of image frames from the program based upon a scene separation duration, wherein selecting the plurality of image frames further comprises, for each of the selected image frames:
      evaluate at least one characteristic of each of the selected image frames,
      wherein the evaluated characteristic indicates that the selected image frame is suitable for presentation to a user when the selected image frame does not present text on a solid background, and
      wherein the evaluated characteristic indicates that the selected image frame is unsuitable for presentation to the user when the selected image frame presents the text on the solid background; and
   select another image frame in proximity to the unsuitable selected image frame when the evaluation indicates that the selected image frame is unsuitable for presentation, wherein the other image frame does not present the text on the solid background;
   generate a plurality of thumbnail-sized images, wherein one thumbnail-sized image is generated from each of the suitable image frames and the selected other image frames associated with unsuitable image frames;
   generate a scene index that is configured to present the plurality of thumbnail-sized images in a time ordered sequence corresponding to a subject matter presentation sequence of the program; and
a presentation device interface communicatively coupled to the processor system, and configured to communicatively couple the media device to a presentation device with a display,
wherein the scene index is communicated from the presentation device interface to the presentation device for presentation on the display.

18. The media device of claim 17, further comprising:
a remote interface configured to:
   receive a first user instruction to present an electronic program guide (EPG) on the display, wherein the EPG presents a list of a plurality of programs that are available for presentation on a first portion of the EPG, and wherein the list of the plurality of programs includes the program; and
   receive a second user instruction that causes a selected one of the programs shown on the list of the EPG to be highlighted;

wherein the first scene index with the plurality of thumbnail-sized images associated with the selected program is presented on a second portion of the EPG in response to receiving the second user instruction.

19. The media device of claim 18, further comprising:
a memory medium configured to store the generated plurality of thumbnail-sized images; and
an external device interface configured to communicatively couple the media device to an external device, wherein the external device interface is configured to receive a plurality of other scene indexes associated with a plurality of other programs from the external device, and wherein the other scene indexes comprise a plurality of thumbnail-sized images,
wherein the received other scene indexes are saved into the memory medium, and
wherein one of the other scene indexes are presented on the second portion of the EPG in response to receiving a third user instruction that highlights one of the other programs listed on the EPG.

20. The media device of claim 18, further comprising:
a memory medium configured to store a plurality of other scene indexes associated with a plurality of other programs, and wherein the other scene indexes comprise a plurality of thumbnail-sized images,
wherein the received other scene indexes are saved into the memory medium, and
wherein when the other programs are listed on the EPG, and in response to receiving a third user instruction that highlights one of the other programs, the scene index associated with the highlighted one of the other programs is presented on the second portion of the EPG.

* * * * *